Feb. 23, 1926.

C. M. SCHAEFFER 1,574,260

AUTOMATIC PRESSURE OPERATED FUEL VALVE

Filed June 11, 1924

Inventor

C. M. Schaeffer.

By

Lacy & Lacy, Attorneys

Patented Feb. 23, 1926.

1,574,260

UNITED STATES PATENT OFFICE.

CHARLES M. SCHAEFFER, OF ALLENTOWN, PENNSYLVANIA.

AUTOMATIC PRESSURE-OPERATED FUEL VALVE.

Application filed June 11, 1924. Serial No. 719,422.

*To all whom it may concern:*

Be it known that I, CHARLES M. SCHAEFFER, a citizen of the United States, residing at Allentown, in the county of Lehigh and State of Pennsylvania, have invented certain new and useful Improvements in Automatic Pressure-Operated Fuel Valves, of which the following is a specification.

This invention relates to an improved automatic pressure operated fuel valve for internal combustion engines and seeks to provide a device for cutting off the fuel supply and thus stopping the engine when the oil pressure of the lubricating system of the engine fails, to thereby prevent injury to the engine through faulty lubrication.

The invention further seeks to provide a device which will prevent operation of the engine when the lubricating oil becomes diluted with fuel or when the lubricating qualities of the oil become exhausted so that the oil is not, for such reason, maintained at proper pressure.

And the invention still further seeks to provide a device which will be dependable in its operation and which may be readily installed.

Other and incidental objects will appear hereinafter.

Figure 1:
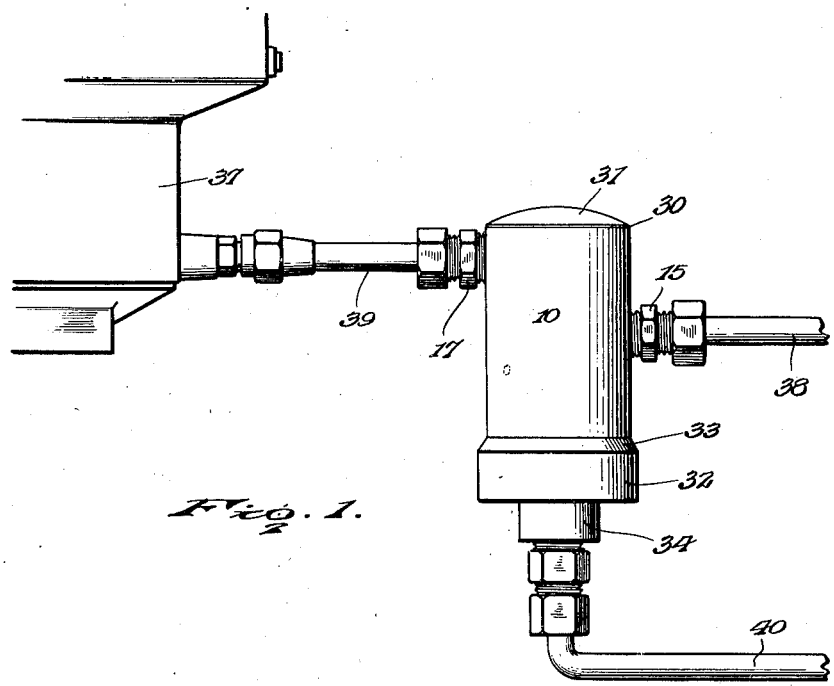
Figure 1 is a side elevation showing my improved valve installed.
Figure 2:
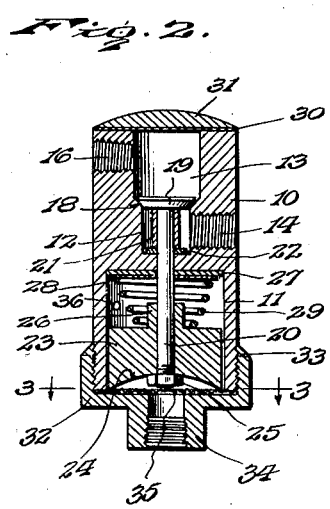
Figure 2 is a detail vertical sectional view through the device, and
Figure 3:
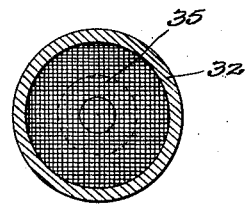
Figure 3 is a transverse sectional view on the line 3—3 of Figure 2, looking in the direction indicated by the arrows.

In carrying the invention into effect, I employ a valve body 10 provided at its lower end with a piston chamber 11 and at its upper end with a fuel inlet chamber 12 which latter chamber opens into an enlarged fuel outlet chamber 13. Entering the chamber 12 is a threaded bore 14 which receives a nipple 15 and communicating with the chamber 13 is a similar bore 16 into which is screwed a nipple 17. At the junction of the chambers 12 and 13 is a beveled valve seat 18 and arranged to cooperate with said seat is a valve 19 having a stem 20 slidable through the bottom wall of the chamber 12 and projecting axially of the piston chamber 11. Surrounding the valve stem to bear at one end against the valve is a sleeve 21 and fitting the valve stem to abut said sleeve at its opposite end is a gasket 22 which may be of leather or other suitable material. Mounted upon the lower end of the valve stem 20 is a piston 23 snugly but slidably fitting in the chamber 11. The piston is bored centrally to receive the stem therethrough and is cupped at its lower end, as indicated at 24, to accomodate a nut 25 screwed upon the stem for limiting the piston against displacement. At its upper end, the piston is provided with a collar 26 and snugly surrounding the valve stem to seat flat against the top wall of the chamber 11 is a gasket 27 fitting said chamber. Overlying the gasket is a metal washer 28 and bearing at its larger end against said washer is a volute spring 29, the smaller end of which surrounds the collar 26 of the piston to rest against the piston. Overlying the upper end of the body 10 is a metal plate 30 closing the chamber 13 and secured to the body by solder 31. Screwed upon the lower end of the body is a cap 32 preferably locked against displacement by solder 33 and formed on the cap is an axial nipple 34. Clamped between the cap and the lower end edge of the body is a screen 35 for filtering the oil entering the chamber 11 and formed through the wall of said chamber near the upper end thereof is a vent opening 36 in order that the piston may freely move upwardly within the chamber.

In Figure 1 of the drawings, I have shown my improved valve installed. As suggested, the device is preferably interposed in the fuel supply line of an engine adjacent the carbureter, a carbureter being conventionally illustrated at 37. Connected to the nipple 15 is a pipe 38 leading from the vacuum tank or fuel supply tank, as the case may be, and extending between the nipple 17 and the carbureter is a pipe 39. Connected to the nipple 34 of the device is a pipe 40 leading from the oil pressure pump of the engine or otherwise connected with the oil pressure line but since the pump mentioned forms no part of the present invention, it has been deemed unnecessary to show such a pump.

As will now be seen in view of the foregoing description, when the engine is running and the oil pump is in operation, oil will be forced through the pipe 40 to act against the piston 23 for lifting the piston and opening the valve 19 so that fuel may flow from the pipe 38 into the chamber 12 and thence into the chamber 13 to discharge through the pipe 39 to the carbureter. The spring 29 is of such tension that normal oil pressure will be required to raise the piston 23 and the gauge of the material used in forming the spring may be varied to suit different pressures, as may be found necessary in installing the device upon different engines. Thus, as long as the oil pressure of the lubricating system of the engine remains normal, the valve 19 will be held open to permit flow of liquid fuel to the engine carbureter. However, should the oil pump fail or should the oil become diluted with fuel, or the lubricating qualities of the oil become exhausted so that the pressure of the oil would fall below normal, the spring 29 will close the valve so that the supply of fuel to the carbureter will be cut-off. Thus, injury to the engine through faulty lubrication will be prevented. When the piston 23 is raised, the collar 26 will bear against the washer 28 for compressing the gasket 27 about the valve stem 20 to thus prevent leakage of fuel around the valve stem from the chamber 12 into the chamber 11 while, when the valve is closed, the gasket 22 will be compressed about the valve stem by the sleeve 21 to prevent the leakage of fuel around the valve stem. I accordingly provide a particularly simple and efficient device for the purpose set forth and, as will now be appreciated, a device which may be readily installed.

Having thus described the invention, what I claim is:

An automatic fuel valve including a body having an inlet chamber, a communicating outlet chamber and a piston chamber separated from the inlet chamber by a dividing wall, the body being formed with a valve seat at the junction of the inlet and outlet chambers, a valve cooperating with said seat and provided with a stem extending through said wall into the piston chamber, a sleeve surrounding the stem, a gasket carried by the stem and compressed by said sleeve against said wall when the valve is closed, a pressure operated piston carried by the valve stem and slidable in said piston chamber for opening the valve, the piston being provided with a collar, a spring acting against the piston for normally holding the valve closed, and a gasket surrounding the stem and compressed against said wall by the collar when the valve is open.

In testimony whereof I affix my signature.

CHARLES M. SCHAEFFER. [L. S.]